Patented May 1, 1945

2,374,999

UNITED STATES PATENT OFFICE 2,374,999

PEST CONTROL

George E. Holbrook, Wilmington, Del., and Frank H. Kaufert, St. Paul, Minn., assignors to E. I. du Pont de Nemours & Company, Wilmington, Del., a corporation of Delaware No Drawing. Application September 24, 1940, Serial No. 358,098

5 Claims. (Cl. 167—30)

This invention relates to pest control and is particularly directed to methods and compositions for preventing or arresting infestations of insects, fungi, bacteria, protozoa, molds and various other organisms economically harmful to man which commonly infest organic matter, whether plant or animal or of plant or animal origin, either in the natural, fabricated or synthetic state; which methods and compositions distinguish from the processes and compositions known heretofore in the use of poly-chloro-nitrobenzenes, especially eutectic mixtures of isomeric dichloro-nitrobenzenes. More particularly the invention relates to the control of noxious organisms which infest soil, such as termites, eelworms, fungi and the like, and to soil poisoning or disinfecting compositions containing as an essential active ingredient a poly-chloro-nitrobenzene.

Subterranean termites infest the greater portion of the United States and other warm or temperate places, and because of their peculiar habit of living in subterranean retreats from which they infest wooden buildings and constructions without overtly giving any indication of their presence create problems of control which are not generally encountered with other types of pests. Because the presence of termites is seldom discovered until substantial damage has been done the best means of control has been by the use of preventive measures, and various allegedly termite-proof constructions have been proposed and are in common use. However, the control is effected, whether by use of termite shields or other means, or by eradication or by prevention, it is now generally recognized that the control is more effective and reliable if the surrounding terrain from which termites could possibly infest the building or construction is treated with a suitable soil poison.

A substance toxic to termites and incorporated in a vehicle suitable for impregnating the soil may act to kill the termites or at least to prevent them from infesting the building or construction by diffusing into the subterranean passages and retreats of the termites through its volatility, water-solubility and like properties. Water-soluble soil poisons such as sodium arsenite, while highly effective, suffer disadvantages in that they tend to leach out during weathering and also tend to pollute water supplies. Water-soluble compounds, and the water solubility need only be small, are more likely also to cause injury to ornamental plants. Water-insoluble compounds such as ortho-dichloro-benzene and the chloropentanes are more commonly employed but also suffer disadvantages in that because of high volatility they do not afford protection for a sufficient length of time. Also, many of the known soil poisons such as beta-naphthol and diphenylamine seem to undergo deterioration and become inactivated in the soil. Other materials such as the chlorinated phenols and nitro phenols are not only hazardous to use but frequently suffer the disadvantages of both the soluble and insoluble type in view of the solubilizing effect of alkali in the soil.

The ideal toxicant for a soil poison for termites is one which is water-insoluble and substantially inert to the constituents of the soil and the atmosphere, which is not so volatile as to become ineffective in a relatively short time and which is so highly toxic to termites that notwithstanding its slight volatility it is effective in relatively small concentrations. The ideal toxicant additionally should be easily applied, that is, it should be a liquid or highly soluble in cheap solvents, or it should be easily emulsified. Also, it should be safe to handle in the sense of not creating fire hazards or causing injury to human beings or to ornamental plants and shrubbery. Above all, it should be cheap and readily available.

Now it has been found that the poly-chloro-nitrobenzenes have properties which make them eminently suited for the control of certain types of pests, particularly termites and fungi, and that their cheapness and and availability coupled with their toxicological and physical properties combine to make them suited to the control of a wide variety of pestiferous organisms. We have found especially that eutectic mixtures of isomeric dichloro-nitrobenzenes are particularly advantageous in soil poisons for termites in view of their high toxicity, low volatility and liquid form, qualities which combine to provide ease of application, high efficiency and permanence.

The poly-chloro-nitrobenzenes to which this invention is particularly directed are obtainable by the chlorination and nitration of benzene. Several different isomeric products are thus obtainable and mixtures of isomers of different kinds and in different proportions are obtainable depending upon the order and the nature of the chlorinating and nitrating reactions. For example, benzene may be chlorinated and then nitrated to yield a mixture of ortho and para-chloro-nitrobenzene. When the ortho-chloro-nitrobenzene is isolated and chlorinated there is obtained a mixture of 2,3-dichloro-nitrobenzene and 2,5-dichloro-nitrobenzene. When this product is sweated the 2,5-isomer crystallizes out leaving a eutectic mixture of the 2,5- and the 2,3-isomers. The mixed ortho and para-chloro-nitrobenzene may also be chlorinated to yield a mixture of isomeric dichloro-nitrobenzenes. On the other hand, if mono-chloro-benzene is chlorinated there is obtained a mixture of ortho and para-dichloro-benzene. Nitration of the ortho-dichloro-benzene produces a mixture of 3,4-dichloro-nitrobenzene and 2,3-dichloro-nitrobenzene. When this product is sweated to induce crystallization a eutectic mixture is also obtained. The mixed ortho- and para-dichlorobenzene may also be nitrated to yield a mixture of isomeric dichloro-nitrobenzenes. Any of the dichloro-nitrobenzenes or mixtures thereof may be further chlorinated to yield trichloro-nitrobenzenes. Nitration of trichloro-benzene also yields mixed trichloro-nitrobenzenes. Mixtures of trichloro- isomers are thus obtained which may vary in proportions according to the method of its preparation. Unless otherwise specified the mixed trichloro-nitrobenzenes hereinafter specified were obtained by chlorinating a mixture of the 2,5- and 2,3-dichloro- isomers.

In soil poisons for termites it is desirable that the lower molecular weight compounds, that is, the dichloro- isomers, be employed, particularly mixtures in or approximating eutectic proportions. For use in industrial preservatives and disinfectants, as for example in the preservation and disinfection of wood, wallboard, rope, fabric, leather, fish net, paper, paint, regenerated cellulosic products, etc., to prevent attack by fungi, insects, bacteria and other harmful organisms, a product of higher molecular weight such as the trichloro-nitrobenzenes is preferred. The degree of chlorination in most cases can be adjusted as desired to give products most suited for the particular application.

The effectiveness of the poly-chloro-nitrobenzenes is shown in the following example in which the two different eutectic mixtures of dichloro-nitrobenzenes are compared as soil poisons for termites with several materials heretofore used and suggested for this purpose:

Example 1

A good grade of dry garden soil is carefully mixed with a measured quantity of the chemical tested, and placed in jars containing paper or other cellulosic material to act as food for the termites. Sufficient water is added to moisten the mixture. From 50 to 100 worker termites are then added to each test container and the condition of the termites is determined 24 hours later. Additional termites are added at intervals and observations made over an extended period.

The effectiveness of the test compound is expressed as follows:

| Rating | Description |
| --- | --- |
| 10 | Termites all dead—little penetration into soil. |
| 8 | Termites all dead—deep penetration into soil. |
| 6 | Majority (50%+) termites dead—little penetration into soil. |
| 4 | Majority (50%+) termites dead—deep penetration into soil. |
| 2 | Majority termites alive (90%+)—little penetration into soil. |
| 0 | Majority termites alive (90%+)—deep penetration into soil. |

These results obtained in a series of tests after four months are given in the following table:

| Compound | Concentration of chemical in soil | | | | |
| --- | --- | --- | --- | --- | --- |
| | 1:200 | 1:400 | 1:800 | 1:1600 | 1:3200 |
| Eutectic of 2,3- and 3,4-dichloro-nitrobenzene [1] | 10 | 10 | 10 | 10 | 4 |
| Eutectic of 2,3- and 2,5-dichloro-nitrobenzene [1] | 10 | 10 | 10 | 10 | 4 |
| Ortho-dichlorobenzene [2] | 8 | 0 | 0 | 0 | |
| Dichloro-pentane [2] | 4 | 0 | 0 | 0 | |
| Alpha-nitronaphthalene [2] | 10 | 8 | 0 | 0 | 0 |

[1] Effective at 1 to 800 after 6 months.
[2] Not effective at 1 to 200 after 6 months.

A concentrated emulsion suitable for preparing Suitable compositions for applying these materials to soil may be prepared as follows:

Example 2 dilute spray emulsions is prepared by blending together 22½ parts of 2,5-dichloro-nitrobenzene, 2½ parts ortho-dichloro-benzene and 25 parts straw paraffin oil of viscosity 65 sec. Saybolt, to form a clear solution from which the 2,5-dichloro-nitrobenzene does not separate at normal temperatures, and emulsifying this oil solution in 49 parts of a casein-borax solution prepared from 3 parts of borax and 6 parts of casein for each hundred parts of water. One part of sodium lauryl sulfate is also included and the emulsion is effected simply by passing all the components through a colloid mill. The product is a stable, highly concentrated emulsion which is sufficiently fluid to pour easily and which may be diluted with large quantities of water without breaking. It should be applied to the soil in dilution of 1 to 2 parts of the concentrate per 2 parts of the water. The amount required must be gauged by the experience of the operator and in accordance with the comparative data given in the foregoing table.

The ortho-dichloro-benzene functions to reduce the melting point of the 2,5-dichloro-nitrobenzene and to increase its solubility in the oil. If it is not used, more oil is required and the concentration of the 2,5-dichloro-nitrobenzene in the dispersed phase is correspondingly reduced. The ortho-dichloro-benzene may be used in amounts up to 50 per cent of the amount of 2,5-dichloro-nitrobenzene and the oil preferably should not constitute more than about 50 per cent of the dispersed phase. In place of the paraffin oil any cheap solvent may be employed. The mineral oils are most desirable and may be used from mineral spirits up to a mineral oil having a viscosity of 110 sec. Saybolt. The relatively non-volatile solvents are preferred. Other emulsifying agents may be used in place of the solubilized casein and other wetting agents in place of the sodium lauryl sulfate.

Another suitable composition can be prepared according to the following example:

Example 3

A composition similar to that described in Example 2 is prepared by blending 25 parts of the eutectic of 2,3 and 3,4-dichloro-nitrobenzenes in 25 parts of straw paraffin oil of viscosity of 65 sec. Saybolt and emulsifying the solution thus obtained in the manner described in Example 2. Ortho-dichloro-benzene is not used in this formulation because the eutectic mixture has essentially the same effect in reducing the melting point and in increasing the miscibility of the product in the paraffin oil.

Another suitable composition is prepared according to the following example:

*Example 4*

A composition which is self-dispersible is prepared by blending together 85 parts of the eutectic of 2,3- and 2,5-dichloro-nitrobenzenes and 15 parts of piperidine oleate. The product is a clear solution from which dilute emulsions may be easily prepared if precaution is taken first to prepare a concentrated emulsion. It is suitable to pour the product into an equal quantity of water, stir well and dilute with water as desired. One to 2 parts of the concentrate to each 10 parts of water provides an emulsion suitable for spraying termite infested soil.

In place of the eutectic mixtures there can be substituted other mixtures of pure isomers with or without ortho-dichloro-benzene as described in Example 2. In either case paraffin oil or like solvent as described in Example 2 may be used to reduce the concentration of chloro-nitrobenzene in the dispersed phase. Other emulsifying agents may be used, but unlike Examples 2 and 3 these must be of the oil-miscible or oil-soluble types, or must be used in conjunction with a blending agent to solubilize them in the concentrate. An example of the latter type is N-diethyl-N-cyclohexylamine lauryl sulfate, which becomes oil-miscible when blended with a higher alcohol such as oleyl alcohol and other water-insoluble normally liquid alcohols. Other amine salts of the higher alcohol sulfates, as described in U. S. Patent 2,139,256, may be similarly employed. Other oil-soluble emulsifying agents include the sulfonated mineral oils and sulfonated vegetable oils such as Turkey red oil.

While we have described our invention with particular reference to soil poisons for termites, it is to be understood that in its broader aspects the invention is not so limited but extends to and includes the use of poly-chloro-nitrobenzenes in the preservation of various products such as wood, wallboard, rope, fabric, leather, fish net, paper, paint, regenerated cellulosic products, etc., from attack of fungi, insects, bacteria and like harmful organisms.

The effectiveness of the poly-chloro-nitrobenzenes in control of various fungi is shown in the following table:

| Compound | Minimum concentration inhibiting all growth of— | | | |
|---|---|---|---|---|
| | Mixed lumber molds | Aspergillus niger | Lenzites trabea | Fomes annosus |
| Eutectic of 2, 3- and 3, 4-dichloronitrobenzenes | 1-32,000 | 1-32,000 | 1-16,000 | 1-16,000 |
| Eutectic of 2, 3- and 2, 5-dichloronitrobenzenes | 1-8,000 | 1-8,000 | 1-8,000 | 1-16,000 |
| Mixed trichloronitrobenzenes | 1-16,000 | 1-8,000 | | |

Thus the mixed trichloro-nitrobenzenes either alone or in admixture with phenyl mercury oleate or pentachlorophenol or other preservatives may be dissolved in a volatile solvent such as mineral spirits having a flash point of about 102° F., commonly known as Stoddard solvent, and used to treat door casings, window sashes, moldings and like millwork. A solution containing 2.45% mixed trichloro-nitrobenzenes, 0.05% phenyl mercury oleate, 0.05% paraffin oil 110 sec. Saybolt and the balance mineral spirits is suitable. Also, a composition containing 2% mixed trichloro-nitrobenzenes, 0.5% pentachlorophenolate and the balance mineral spirits is suitable. A 2.5% solution of the mixed trichloro-nitrobenzenes in mineral spirits also may be used.

In place of the mineral spirits we may use other volatile solvents such as fuel oil, kerosene, acetone, alcohol, dimethyl ether, etc. The impregnating compositions may also include other materials adapted to improve the character of the millwork. Thus they may include the drying or semi-drying oils with or without a drier, such as tung oil, perilla, oiticica, soya bean and dehydrated castor oil. They may also include waxes, rosins, rosin esters such as diethylene glycol ester and copal ester, and other materials suitable for use in conjunction with millwork.

Similar compositions may be used for impregnating wood, fabric, rope, wallboard, fish net, leather and like porous materials. In the case of rope it is suitable to dissolve the mixed trichloro-nitrobenzenes in the heavy lubricating oils used to finish the rope and in the case of leather and some other products non-volatile solvents are entirely proper and suitable. Paints subject to mold similarly may be treated and many other applications in the industrial field will be readily apparent.

We claim:

1. The method of protecting wood and wood products from attack by termites which comprises impregnating the terrain surrounding the wood with a eutectic mixture of isomeric dichloro-mono-nitrobenzenes.

2. A preservative and disinfectant composition containing as an essential active ingredient a eutectic mixture of isomeric dichloro-mono-nitrobenzenes and a carrier therefor.

3. The method of preventing infestation of materials by pests which comprises impregnating the material subject to infestation with a toxicant composition an essential active ingredient of which is a eutectic mixture of isomeric dichloro-mono-nitrobenzenes.

4. A preservative and disinfectant composition comprising an oil solution of an eutectic mixture of isomeric dichloro-mono-nitrobenzenes.

5. A preservative and disinfectant composition consisting in an aqueous dispersion the dispersed phase of which comprises an oil solution of an eutectic mixture of isomeric dichloro-mono-nitrobenzenes.

GEORGE E. HOLBROOK.
FRANK H. KAUFERT.